Oct. 22, 1963     L. T. ZATKO     3,107,545

ADJUSTABLE PITCH PULLEY

Filed Sept. 21, 1960

INVENTOR.
LESTER T. ZATKO

BY Ely, Pearne &
Gordon

ATTORNEYS

United States Patent Office 3,107,545
Patented Oct. 22, 1963

3,107,545
ADJUSTABLE PITCH PULLEY
Lester T. Zatko, 35690 Dorchester Drive,
Cleveland 19, Ohio
Filed Sept. 21, 1960, Ser. No. 57,555
1 Claim. (Cl. 74—230.17)

This invention relates to adjustable pitch pulleys. The invention contemplates an adjustable pitch pulley which is arranged and assembled to achieve, at relatively low manufacturing costs, high standards with respect to strength, dimensional accuracy, and service life.

The pulley provided by the present invention has the above advantages and is of the type comprising a pair of pulley hub portions and a pair of sheave flanges with each of the hub portions rigidly mounting its own one of the pair of flanges and in turn being independently and directly mounted on the pulley shaft in releasable association, the pulley assembly being provided with means for jacking the hub portions together and apart for adjusting the distance between the pulley sheave flanges. Pulleys of this same type have been previously proposed, but the present invention is particularly advantageous as compared to such prior pulleys not only because it may meet the same or better standards of strength, dimensional accuracy and service life at lower costs, but also and importantly because of the ease with which it may be installed on a shaft and given any desired pitch diameter without the need for measuring gages or tools of any kind other than the measuring and gauging means inherent in the construction of the pulley assembly itself, and without any necessity for tightening down to and then backing away from the minimum pitch diameter setting, as in the most pertinent of the adjustable pitch pulleys heretofore proposed.

These and other purposes served by the invention will be clarified by the following exemplificative description of a specific embodiment of the invention.

Figure 1:
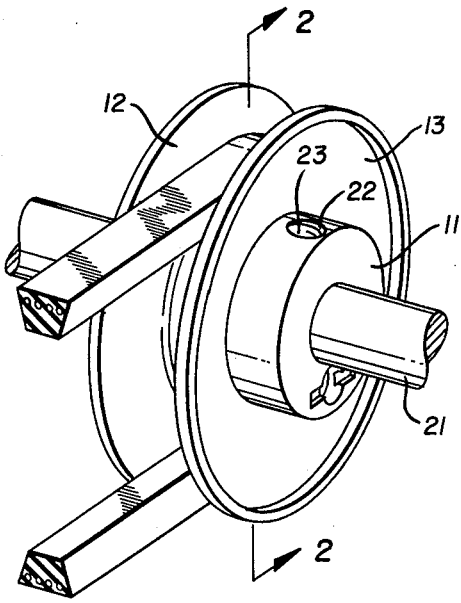
FIGURE 1 is an isometric view of a pulley wheel embodying the invention, together with fragmentary portions of the pulley belt and pulley shaft associated therewith.

The illustrated pulley wheel comprises a pair of pulley hub portions 10 and 11 and a pair of sheave flanges 12 and 13. The hub members may each be formed from standard screw stock. The hub portion 10 has a great outer periphery 15 and a small outer periphery 16, with the step between the peripheries 15 and 16 defining a shoulder 17. The hub portion 12 has a great outer periphery 18 and a small outer periphery 19, with the step between the peripheries 18 and 19 defining a shoulder 20. Each of the flanges 12 and 13 has a wall of substantially uniform given thickness. The flanges are welded or otherwise suitably affixed against the shoulders 17 and 20, respectively. The wall thicknesses of the flanges 12 and 13 are not less than the width of the small peripheries 15 and 16, respectively.

Each of the hub portions 10 and 11 has a central axial bore for reception of a common pulley shaft 21. The central axial bore of each of the hub portions 10 and 11 is intersected by a tapped, radially extending hole 22 for reception of one of the setscrews 23.

Means is provided for jacking the hub portions 10 and 11 together and apart for adjusting the pitch diameter of the pulley. The jacking means includes an axially extending, laterally located, threaded bore 30 in the hub portion 10, in which is threadedly engaged an Allen head screw 28. A second axially extending, laterally located bore which need not be threaded is provided in the hub portion 11 and receives the head of the screw 28 in such a manner that the screw head is interlocked for axial movement in both directions with the hub portion 11. As shown in the drawings, this last-mentioned laterally located bore has a first small diameter portion 31 and a second counterbore portion 32, with the screw head being received within the counterbore portion 32. The outer end of the counterbore portion 32 is swaged, as at 35, to form detent means 36 which is in interfering relation with egress of the screw head from the outer end of the counterbore 32. The swaging is, of course, performed after the screw 28 has been inserted in the hub portion 11. The first small diameter portion 31 of the bore is of smaller diameter than the screw head and receives the portion of the screw shank which is adjacent the screw head. It will thus be evident that the screw head is indeed interlocked for axial movement in both axial directions with the hub portion 11, albeit there may be some lost motion between the axial motion of the screw head and the axial motion of the hub portion 11.

Figure 3:
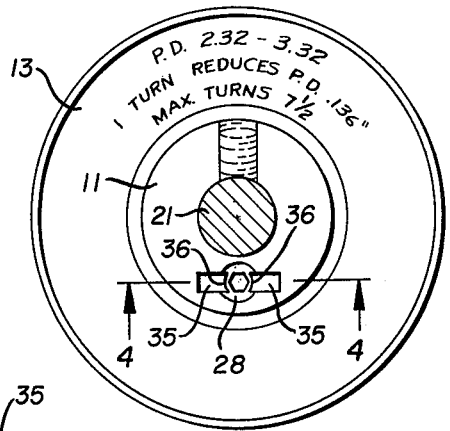
FIGURE 3 is an end view of the pulley wheel shown in FIGURE 1, the pulley belt having been omitted.
Figure 4:
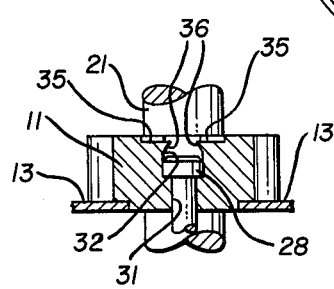
FIGURE 4 is an enlarged sectional detail view of one of the two hub portions of the pulley wheel taken from the plane of line 4—4 in FIGURE 3.

It will be evident that adjustment of pitch diameter is effected by turning the screw 28 to jack the flanges 12 and 13 toward and away from each other, and that the amount of change is in direct ratio to the number of turns or fractions thereof of the screw after any lost motion has been taken up. This relationship may be indicated by a legend stamped on the nonworking side of one or both of the sheaves 12 and 13, as indicated in FIGURE 3.

When the pulley is being installed and a certain pitch diameter is desired, it can have been made known to the user that when the screw head is held at either extreme of its permissible travel within the counterbore 32 (preferably when it is held against the shoulder between the small bore portion 31 and the counterbore portion 32, a natural position when the screw is being brought into threaded engagement with the bore 30), the indicated maximum pitch diameter will obtain as soon as threaded engagement is effected between the screw and the bore 30. In pulleys using turnbuckle type connectors, in which a screw member has threads of opposite hand engaging with the two pulley halves, no such reference is possible, and it is necessary to fully tighten the pulley halves together in order to obtain a minimum pitch diameter reference and then to back off again to the desired pitch diameter according to the known relationship between rotation of the screw member and change in pitch diameter.

Figure 2:
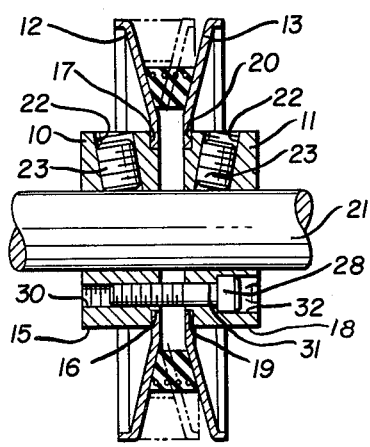
FIGURE 2 is a vertical section taken on the plane of line 2—2 in FIGURE 1.

Of importance is the fact that the pulley provided as above has certain advantages in common with the adjustable sheave pulley which is the subject of U.S. Patent No. 2,746,307. When the pulley is under load, the torsional stresses running annularly in shear around the central portion of the hub assembly are more than adequately accommodated by the area of contact between each flange and the shoulder of the hub portion with which it is associated. Axial loads due to the wedging action of the pulley belt are taken by the transverse faces of the opposite shoulders 17 and 20. In the minimum pitch diameter position shown in phantom view in FIGURE 2, the inner rims of the flanges bear against each other to reinforce each other against flexure, thus minimizing fatigue of the flange walls. On the other hand, as the flanges are moved apart, driving engagement with the belt tends to extend progressively radially inwardly approaching the condition where axial loads are absorbed directly by the faces of the shoulders 17 and 20 with substantially no flexure of the flange walls.

Several variations in the specific pulley construction I have disclosed will suggest themselves to those familiar with fabrications of assemblies of the type to which this invention is directed.

What is claimed is:

An adjustable pitch-diameter pulley comprising a pair of pulley hub portions, each of said hub portions having a great outer periphery, a small outer periphery and a step between said great and small outer peripheries defining a shoulder, a pair of pulley sheave flanges each comprising a wall of substantially uniform given thickness extending radially outwardly from said hub portions and being axially spaced from each other by progressively greater amounts with increasing radial distance from the center of said pulley, each of said hub portion shoulders facing the other, said given wall thickness for each flange being not less than the width of said small periphery of the hub portion associated therewith, each of said hub portions having a central axial bore intersected by a tapped radially extending hole for reception of a setscrew, said central axial bores both being of the same diameter for reception of a common pulley shaft, said pulley including means for jacking said hub portions together and apart for adjusting the pitch diameter of said pulley, said jacking means comprising a screw having a shank and an enlarged head, an axially extending laterally positioned bore in each hub portion, with a first of said laterally positioned bores being tapped to threadedly receive said screw, the second of said laterally positioned bores having a first small diameter portion and a second counterbore portion, said second counterbore portion receiving the head of said screw, the outer end of said counterbore portion being swaged to form detent means which is in interfering relation with egress of said screw head from said counterbore, the first small diameter portion of said second laterally positioned bore being of smaller diameter than said screw head and receiving the portion of said screw shank which is adjacent said screw head.

References Cited in the file of this patent

UNITED STATES PATENTS

| | | |
|---|---|---|
| 2,209,737 | Livingston | July 30, 1940 |
| 2,263,731 | Hynek | Nov. 25, 1941 |
| 2,555,189 | Fuchslocher | May 29, 1951 |
| 2,577,516 | Firth | Dec. 4, 1951 |
| 2,657,584 | Williams | Nov. 3, 1953 |
| 2,722,842 | Firth | Nov. 8, 1955 |
| 2,753,723 | Nuernberger et al. | July 10, 1956 |
| 2,973,656 | Kurre | Mar. 7, 1961 |